United States Patent [19]
Strukel

[11] 3,860,805
[45] Jan. 14, 1975

[54] METHOD AND APPARATUS FOR PRODUCING A FAIRING CONTOUR IN NUMERICAL CONTROL SYSTEMS

[75] Inventor: Marlene R. Strukel, Farmington, Mich.

[73] Assignee: The Bendix Corporation

[22] Filed: May 7, 1973

[21] Appl. No.: 358,203

[52] U.S. Cl............................ 235/152, 235/151.11
[51] Int. Cl........................... G06f 7/38, G06f 15/46
[58] Field of Search... 235/151.11, 197, 152, 152 IE

[56] References Cited
UNITED STATES PATENTS
3,178,563   4/1965   Wedgwood et al............ 235/151.11
3,518,513   6/1970   Pomella et al............. 235/151.11 X Primary Examiner—Eugene G. Butz
Attorney, Agent, or Firm—Lester L. Hallacher

[57] ABSTRACT

A numerical control method and apparatus for directing a controlled element such as a cutting tool through a fairing contour between two normally intersecting linear displacement segments. The fairing contour is an approximation of a parabola, the actual tool path comprising a number of contiguous linear segments, the end point coordinates of which are calculated by a relatively simple arithmetic process. Both programmable and hardwired computer implementations are disclosed.

11 Claims, 14 Drawing Figures

PATENTED JAN 1 4 1975  3,860,805

METHOD AND APPARATUS FOR PRODUCING A FAIRING CONTOUR IN NUMERICAL CONTROL SYSTEMS

INTRODUCTION

This invention relates to numerical control systems and particularly to a method and apparatus for causing a controlled element, such as a cutter, to follow a segmented parabolic displacement path as a fairing between two successive linear segments of cutter displacement. The invention is applicable to such numerically controlled equipment as milling machines, lathes, plotters, automatic drafting machines, and others.

BACKGROUND OF THE INVENTION

It is well recognized that in the fabrication of various structures or "workpieces" having complex shapes and in the preparation of drawings and other descriptive materials relating to such structures, it is often desirable, if not necessary, to design fillets or fairings between adjacent or intersecting linear surfaces. For example, in the fabrication of a contoured workpiece, a fairing between two linear workpiece segments may be required as a matter of stress relief. Other reasons for programming faired intersections or corners will be apparent to those in the design arts.

The prior art exhibits the development of various interpolating devices capable of generating control signals suitable for use in numerical control systems wherein it is desirable to cause a controlled element to describe a nonlinear displacement path. Such interpolating devices have been shown capable of generating circular and parabolic displacement functions as well as linear displacement functions in a two-axis system. Examples of such prior art interpolating devices are disclosed in the patents to Spencer, et al., U.S. Pat. No. 2,929,555, and Dudman, et al., U.S. Pat. No. 2,928,604. In the Dudman patent, a quadratic interpolating device is described comprising a series of output contacts which are intercoupled by two systems of transformer windings in such a way that on feeding alternating electrical signals to three points on the system of windings, electromotive forces are set up at the output contacts which represent ordinates of a series of points on a quadratic curve drawn through points represented by the applied signals. The output contacts of the interpolator are equiangularly spaced about an axis and are scanned by a contact brush rotatable about such axis so that the contact brush picks up successive voltages representing the y-coordinates of successive closely-spaced points between reference ponts. The brush rotates at a rate directly related to the rate of change of the x-coordinate of the locus of the tool axis so that the position of the brush represents the instantaneous x-coordinate of the tool axis. Since the contacts are equi-spaced, the output signals derived by the brush correspond directly to equal increments of the independent variable, in this case, x. It will be appreciated that with an arrangement as described above, when the three input signals to the interpolator are linearly related, the output signals of the interpolator will also be linearly related.

A disadvantage of the interpolator systems described in the Spencer, et al., and the Dudman, et al., patents arises out of the use of such high maintenance and bulky instrumentalities as transformer windings, contacts which require suitable support and spacing arrangments and the rotatable brush which must be driven in such a fashion as to engage the contacts and apply the resulting control voltage to a controlled element. In short, the implementation of the Spencer, et al., and Dudman, et al., systems is self limiting and incompatible with modern logic and arithmetic circuitry which may be conveniently, compactly and inexpensively implemented using solid state, integrated circuit and other state-of-the-art electronic components.

BRIEF STATEMENT OF THE INVENTION

In accordance with the present invention, a numerical control apparatus and a method for operating such apparatus is provided for causing a controlled element to automatically pass through a segmented approximation of a parabolic fairing contour between two successive linear segments of controlled element displacement in response to the reading of certain prespecified data and a fairing contour code from a numerical control record. In general, this is accomplished by means of a system comprising a controlled element, such as a cutter, means such as machine slides, for controlling the motion of the element along each of at least two independent axes of displacement, a record, such as an N/C tape, containing coded representations of the displacement coordinates of said element with respect to said axes, the record containing definitions of two successive linear segments and further containing a coded representation of a fairing contour command between and related to the linear segment definitions, means, such as a tape reader, for sequentially reading the coded representations of the record, means, such as a storage register, for receiving and storing data defining at least the end coordinates and slope of the first linear segment, means, such as a storage register, for receiving and storing data defining at least the beginning coordinates and slope of the second linear segment, arithmetic means, such as a logic circuit or programmed computer, connected to respond to the fairing contour command to determine the coordinates of at least one intermediate point on a parabolic curve passing through the end coordinates of the first linear segment and the initial coordinates of the second linear segment, the arithmetic means being connected as an output or command device to the controlled element so as to cause the controlled element to move between the end point of the first linear segment and the initial point of the second linear segment by way of the intermediate point or points on the parabola.

In general, the present invention further defines a novel process or method for producing an automatic fairing step in the displacement of a controlled element, such as a cutter, said method involving a simple, repetitious sequence of arithmetic steps which effectively result in the construction of a parabola, but wherein the actual definition of the parabolic curve is not required. In general, this is accomplished by a method which includes defining the starting and exit points of the parabolic fairing contour such definition step typically involving the processing of data defining the slopes of the linear displacement segments immediately preceding and following the fairing contour, defining the coordinates of one and preferably a plurality of intermediate points on the parabolic fairing contour and displacing the controlled element through a series of contiguous linear displacement paths between the intermediate points so as to approximate the parabolic fairing contour to a predetermined degree.

In accordance with the invention, the number of intermediate points which are defined by way of the relatively simple mathematical construction technique hereinafter defined may be varied in accordance with the desired degree of accuracy or tolerance which may be allowed, such tolerance being definable in terms of the permissable distance between the midpoint of any given linear displacement path between any two intermediate points on the parabola and the actual parabolic curve. Accordingly, for high-accuracy applications, it is desirable to define a very low tolerance with the result that a large number of intermediate points and, thus, a large number of linear segments are generated to approximate the parabolic fairing contour.

The method of the present invention may be carried out in connection with conventional numerical control apparatus having a contouring capability and within such apparatus may be implemented in the form of a hard-wired digital arithmetic system or, alternatively, in the form of a suitably programmed digital computer. The invention is especially suited for use in connection with a numerical control system having a dedicated digital computer for arithmetic computation and overall control, such as the Bendix DynaPath System 4 which is available from the Industrial Controls Division, Bendix Corporation, Detroit, Mich.

DETAILED DESCRIPTION OF THE SPECIFIC EMBODIMENT OF THE INVENTION

FIG. 1

Figure 1:
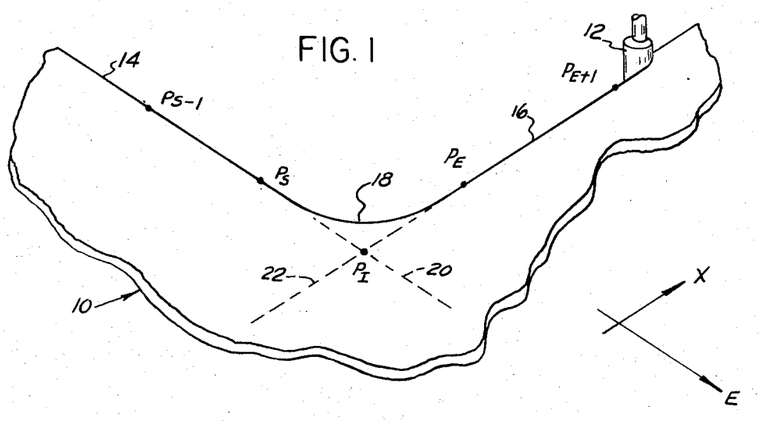
FIG. 1 is a perspective view of a portion of a workpiece illustrating the results of the application of the present invention in the generation of a fairing contour between two linear segments of a workpiece surface.

Referring to FIG. 1, there is shown a workpiece 10 in the form of a relatively thin sheet of metallic material which is in working engagement with a cutter 12. The cutter 12 represents the controlled element of a two-axis milling machine and is adapted for movement relative to the workpiece 10 along orthogonal X and Z axes, as identified in FIG. 1. The workpiece 10 has been formed by the cutter 12 so as to exhibit a machined edge having a first linear segment 14, a second linear segment 16, and a parabolic fairing contour 18 which joins and is contiguous to the linear segments. The linear segment 14, lies on a locus of points which, if extended along the broken line 20, would intersect the broken line 22 on which the locus of points of linear segment 16 lie. The two loci intersect at a point $P_I$, the point at which an abrupt direction change in cutter displacement would occur if the cutter 12 were to follow the extensions of the linear segments 14 and 16. The fairing contour 18 departs tangentially from the linear segment 14 at a starting point $P_S$ and flows tangentially into the linear segment 16 at a fairing contour exit point $P_E$. The locus of points along linear segment 14 defines increments of cutting displacement, such as the increment between point $P_{S-1}$ and $P_S$. Similarly, the locus of points defining linear segments 16 includes increments of cutter displacement, such as the increments between points $P_E$ and $P_{E+1}$. The direction of cutter displacement is from left-to-right as is evident in FIG. 1.

FIG. 2

Figure 2:
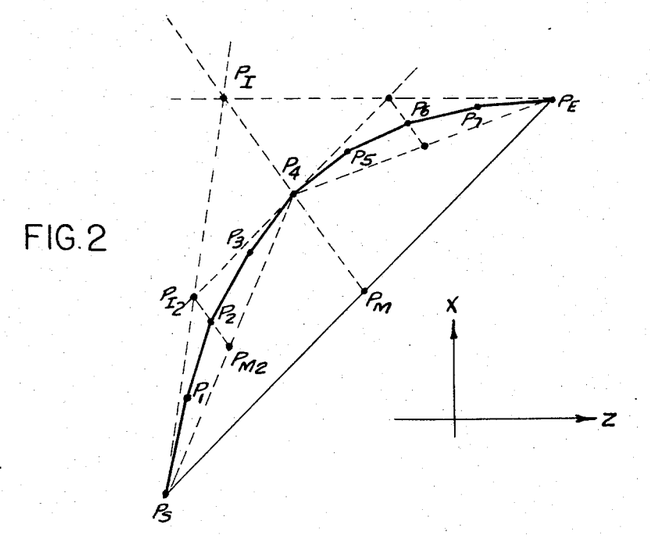
FIG. 2 is a diagrammatic representation of the mathematical process which forms the foundation of the process followed by the apparatus of the subject invention in the course of defining intermediate points on a parabolic fairing contour.

Looking now to FIG. 2, the construction technique which is the basis for the process of the present invention is diagrammatically illustrated as a means for locating intermediate points on a parabolic curve which passes through the points $P_S$ and $P_E$, previously identified with respect to FIG. 1, and wherein the parabolic curve is tangetial to the linear segment $P_S$-$P_I$ as well as the linear segment $P_I$-$P_E$.

The construction technique involved in the location of the coordinates of points P1, P2, P3, P4, P5, P6, and P7 between the known points $P_S$ and $P_E$ involves first the location of the coordinates of point $P_I$, which coordinates represent the intersection between the two known linear segments, and the location of the coordinates of the midpoint $P_m$ of the chord between known points $P_S$ and $P_E$. The point P4 on the parabola is the midpoint or bisector of the line $P_I$-$P_m$.

Once the coordinates of $P_4$ have been identified, the coordinates of $P_2$ may next be found by a repetition of the steps in the process set forth above. The tangent to the parabola at $P_4$ is, according to a known principle of geometry, parallel to the chord $P_S$–$P_E$. Accordingly, the second point of intersection $P_{12}$ is readily located as is the midpoint $P_{M2}$ of the chord $P_s$–$P_4$. The point $P_2$ on the parabola lies at the midpoint or bisector of the line $P_{12}$-$P_{M2}$.

The coordinates of point $P_1$ on the parabola are readily located by a repetition of the previously-described process using the points $P_S$ and $P_2$ as the reference points. Similarly, the additional points $P_6$, $P_5$, and $P_7$ may also be located in that order by following and repeating the instruction techniques set forth above. Once the coordinates of a suitable number of points have been identified and those coordinates have been placed in a suitable storage medium, such as a digital register, it is a relatively straightforward matter to feed the coordinates of such points to the cutter displacement drive mechanism via an interpolator, of a conventional, numerically controlled tool in the proper order so as to cause the cutter to be displaced relative to the workpiece through the coordinates of $P_1$, $P_2$, $P_3$, $P_4$, $P_5$, $P_6$, $P_7$, and $P_E$ in a series of straight line segments of cutter path displacement. As the number of intermediate points and the number of straight line segments of cutter displacement is increased, the accuracy with which the parabolic fairing contour is approximated also increases and the number M of points and straight line segments to be located and followed may be thought of as a variable and controlled quantity to be selected by the operator in accordance with the tolerance determined to be permissible by the operator or part programmer.

FIG. 3

Figure 3:
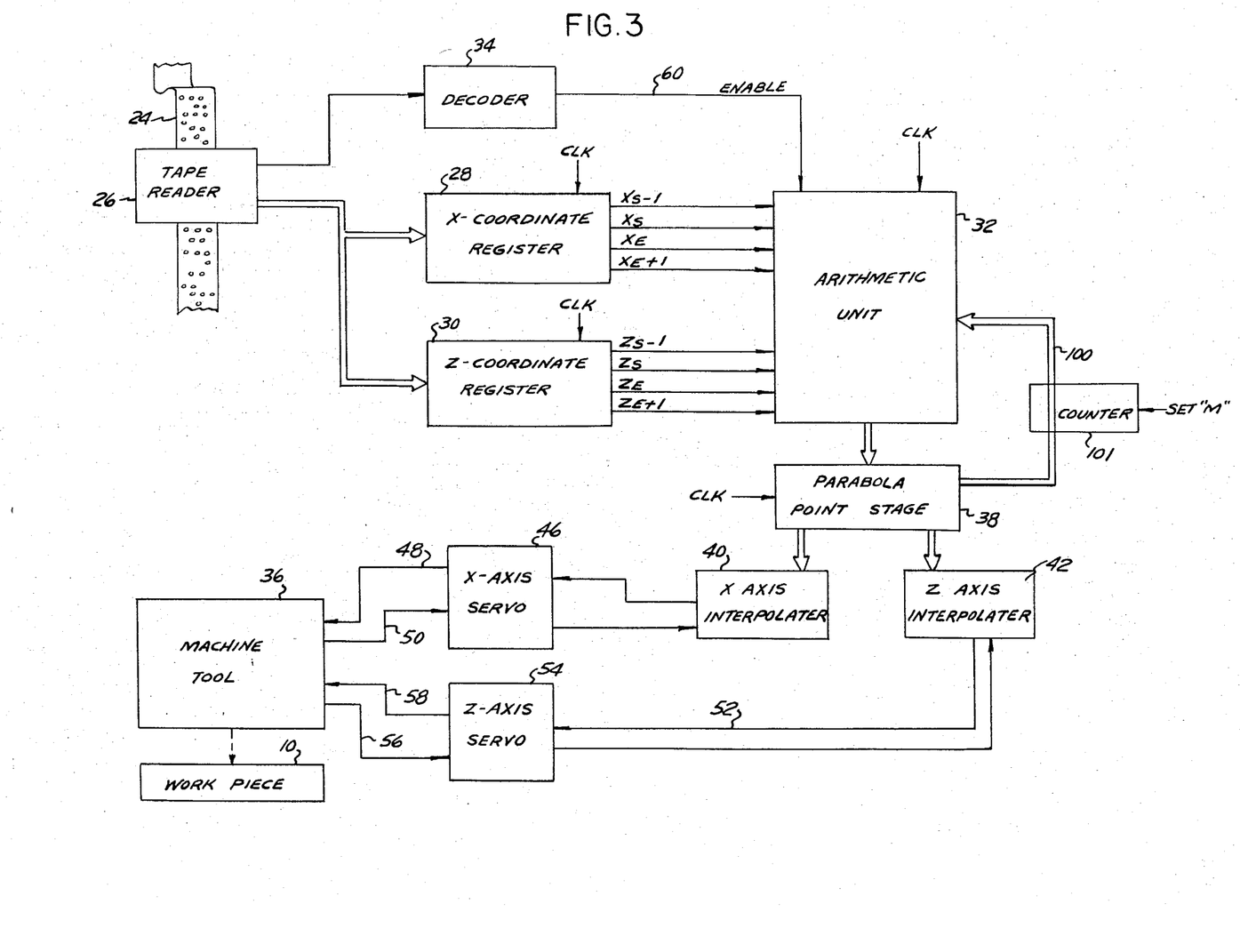
FIG. 3 is a block diagram of a numerical control system embodying the present invention.

Looking now to FIG. 3, there is shown an apparatus which is capable of carrying out the construction process as well as the machining operation previously described as being a part of the process of the present invention. In FIG. 3, a record medium in the form of a punched Mylar tape 24 is shown passing through a tape reader 26 which is capable of reading and decoding the characters on the tape 24 and producing digital signals representing those characters. The punched tape 24 and the tape reader 26 are, of course, merely representative of the well-known prior art devices and no detailed description will be undertaken herein as such devices have been available for many years in the numerical control field. The output of tape reader 26 typically takes the form of a sequentially arranged series of signals representing "blocks" of data including X and Z axis coordinates of points through which the cutter 12 of FIG. 1 is to pass in the process of generating a predetermined workpiece contour, and also such additional data as feedrate, direction numbers, coolant codes, special instruction blocks, and other conventional numerical control data as will be apparent to those skilled in the art.

The sequentially read coordinates of the cutter position commands along the X axis are fed to an X-axis coordinate register 28 which is capable of holding and shifting there through a plurality of such points equal to at least four in number. In FIG. 3, the four X coordinate points which are maintained in storage and which are available for parallel readout at any time are identified as $X_{S-1}$, $X_S$, $X_E$, and $X_{E+1}$, respectively, these bits of data being intentionally correlated with the points $P_{S-1}$, $P_S$, $P_E$, and $P_{E+1}$ of FIG. 1 for purposes of discussion.

The Z-axis coordinate data is fed in a correlated fashion to a register 30 which, like register 28, is capable of holding at least four coordinate codes and providing combinations of such coordinate data in parallel form at the output thereof. Again, the coordinates are identified as $Z_{S-1}$, $Z_S$, $Z_E$, and $Z_{E+1}$ which in turn represents the Z-axis coordinates of points $P_{S-1}$, $BP_S$, $P_E$, and $P_{E+1}$, respectively. The four outputs from the X-coordinate register 28 are shown connected into an arithmetic unit 32 at least portions of which are described in greater detail hereinafter so that the mathematical calculations which represent an illustrative embodiment of the construction technique described with reference to FIG. 2 can be carried out. Similarly, the four output lines of Z-coordinate register 30 are also connected into the arithmetic unit 32 for a like purpose. Finally, a special instruction decoder 34 is connected to receive a predetermined character signal from the tape reader 26 so as to enable the sequential operation of the arithmetic unit 32 to carry out the construction process described with reference to FIG. 2 whenever an appropriate block has been read from tape 24. In this case, the block which calls for the fairing contour construction process is identified by the code "g29," this code format being one which will be readily recognized by those skilled in the numerical control art. The output of the decoder 34 is connected to the arithmetic unit 32 to enable the parabolic construction process using the data which is immediately thereafter available from the X and Z coordinate registers 28 and 30, respectively.

The output of the arithmetic unit 32 is a partially scrambled sequence of X and Z axis coordinates representing the intermediate points $P_1$, $P_2$, $P_3$, $P_4$, $P_5$, $P_6$, and $P_7$ of the parabolic fairing contour, the order in which such coordinates are generated being inconsistent with the order in which such coordinates must be passed onto the machine tool 36 as position commands. Accordingly, the output of coordinate data from arithmetic unit 32 is connected into a parabola point coordinate storage register 38 having a plurality of storage positions and having the inputs thereto prewired in a coded fashion so as to unscramble the coordinates and place them in the proper output sequence according to the correlation between the order in which the position commands must be given and the order in which the intermediate point coordinates are identified.

The output of parabola point coordinate storage unit 38 is, therefore, a sequence of X and Z coordinates beginning with the coordinates of point $P_1$ and ending with the coordinates of point $P_7$ in the illustrative example of FIG. 2. Of these coordinates, the X-axis coordinates are fed along with a feedrate number to the X-axis interpolator 40 and the Z-axis coordinates are fed along with the feedrate number to the Z-axis interpolator 42. The interpolators 40 and 42 are well-known prior art devices, typically digital differential analyzers (DDA's) which are capable of generating position commands in the form of a string of digital pulses, the number of such pulses in any string being representative of a number of increments of machine tool controlled element displacement along the given axis. The pulses representing the position commands from the X-axis interpolator are fed by way of line 44 to a conventional X-axis servo unit 46 which in turn is operatively connected to the machine tool 36 by way of the diagrammatically illustrated control line 48. A position feedback signal is derived from the machine tool itself and is fed by way of line 50 to the servo 46 for the production of a position error signal which effectively determines the position of the controlled element, in this case, the cutter 12, relative to the workpiece 10.

In a similar fashion, the output of the Z-axis interpolator is connected by way of line 52 to the Z-axis servo 54. A position feedback signal is connected from the machine tool 36 to the Z-axis servo 54 by way of line 56 and results in the generation of an error signal which is presented to the machine tool 36 by way of line 58 for position control. The machine tool 36 is operatively connected to the workpiece 10 as symbolically illustrated in FIG. 3.

The overall operation of the system shown in FIG. 3 and generally described above, is to execute the position commands from the displacement record 24 in an entirely conventional fashion, thereby to cause the cutter 12 which is part of the machine tool 36 to follow a predetermined path, relative to the workpiece 10. Such conventional numerical control quantities, such as feedrate numbers, direction numbers, coolant codes, spindle codes, and other quantities, have not been described in detail above as such quantities are all well known to those skilled in the numerical control art and can be carried out using conventional apparatus now commerically available.

When a g29 code is received by the decoder 34 such that an enable signal appears on output line 60 from the decoder 34, the arithmetic unit 32 is caused to compute the intermediate points $P_1$ through $P_7$ of the fairing contour 18 and to feed the coordinates of the intermediate points to the X and Z axis interpolators 40 and 42 through the decoding coordinate storage unit 38 thereby to cause the cutter 12 to move through the fairing contour 18. The point coordinate information from store 38 is fed back to arithmetic unit 32 via feedback path 100. The feedback path includes a counter 101 which is suitable to determine the number of iterations and the number of points "M." The result is the generation of a parabolic fairing contour 18 between the linear segments 14 and 16 is accordance with the present invention. The operation of the interpolators 40, 42 and the servo units 46 and 54 relative to the control of the machine tool 36 is otherwise entirely conventional.

FIG. 4

Figure 4:
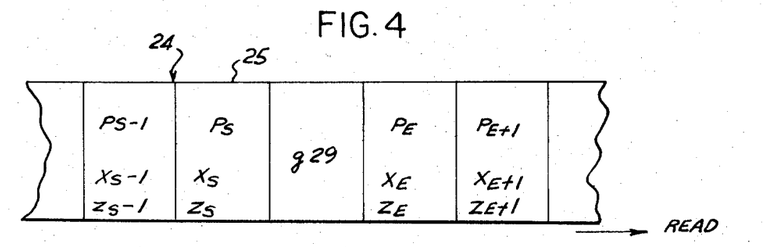
FIG. 4 is a simplified view of a representative portion of a tape for use as a record in connection with the apparatus of FIG. 3.

Looking now to FIG. 4, a schematicized representation of the tape 24 is shown to comprise a sequence of blocks which in this case define the X and Z coordinates of the $P_{S-1}$, $P_S$, $P_E$, and $P_{E+1}$. Between the blocks defining the coordinates of points $P_S$ and $P_E$ a block 25 containing a g29 code is found. Accordingly, the g29 code is that which calls for the automatic fairing contour generation using the coordinate date which is available from the adjacent data blocks.

It is to be understood that while the coordinate data with respect to the four points $P_{S-1}$, $P_S$, $P_E$, and $P_{E+1}$ permit the identification of the coordinates of the intermediate points along the parabolic fairing contour, other combinations of data, such as single point coordinates and direction numbers may be used in accordance with the particular design of the numerical control system being employed. In the preferred embodiment, direction numbers are employed, the slopes of the entering and exiting linear segments 14 and 16, respectively, are easily identified within the X-Z coordinate system thereby to make possible the identification of the coordinates of the intersection point $P_I$ and the coordinates of the other points necessary in the implementation of the construction technique described above with reference to FIG. 2. The g29 block will, in such an embodiment, have a format as follows: g29, $X_E$, $Z_E$, I, K, where I is the direction number of the linear segment 16 exiting fairing contour 18 with respect to the X-axis and K is the direction number of that segment with respect to the Z-axis. This, of course, eliminates the need to read the block beyond the g29 block as would be suggested in FIG. 4, since the g29 block itself contains the data defining exit point $P_E$ and the direction of the segment 16. The coordinates of $P_S$ are available from the previous block. The feedrate may remain constant under normal conditions.

As will be readily appreciated by those familiar with data processing, the functions of the elements 28, 30, 32, 34, and 38 in the system of FIG. 3 may be readily carried out by a properly programmed analog or digital computer having a memory connected to receive the coordinate information and programmed to perform arithmetic calculations on such information and to output the results in a useable fashion. The implementation of the subject invention in a digital computer having general-purpose capabilities is preferred in view of the growing commercial availability of numerical control systems having integrated and dedicated general-purpose computer facilities. As set forth above, an example of such a commercially available system is the DynaPath System 4 which is available from the Industrial Controls Division of Bendix Corporation. It is possible in such an embodiment to read the entire record from tape into the computer memory in an off-line fashion and to thereafter sequentially retrieve program instructions from memory during actual part program execution.

In the following explanation of the implementation of the subject invention using a digital computer, it will be assumed that the record from tape 24 makes available the following information or data which is essentially the equivalent of the data set forth in the description of FIG. 3:

$N_X$, algebraically Z— Direction numbers (alternately motion increments, direction cosines) of the linear segment 16 exiting the fairing contour 18. $N_X$ and $N_Z$ are algegraically signed and are required to define the orientation of the tangent to the parabola at $P_E$. $N_X$ and $N_Z$ are measured with respect to the X and Z axes, respectively. $N_X$ and $N_Z$ are input in the I and K fields of the fairing (g29) block shown on FIG. 4.

$X_S$, $Z_S$ — Coordinates of the initial point of the fairing contour 18. These coordinates are identical to the coordinates of the end point of the linear motion segment 14 preceding the fairing block. $X_S$ and $Z_S$ are available directly from the preceding block in Absolute Input Mode (g90) or by addition in Incremental Input Mode (g91).

$X_E$, $Z_E$ — Coordinates of the final point $P_E$ of the fairing contour 18. These coordinates are identical to the coordinates of the initial point of the linear motion segment 16 following the fairing block. $X_E$ and $Z_E$ are input directly in the fairing block if the control is in Absolute Input Mode (g90) or may be obtaind by addition from the contents of the X and Z fields of the fairing block in Incremental Input Mode (g91).

$\Delta X_S$, $\Delta Z_S$ — Increments of motion for the linear block preceding the fairing block. $\Delta X_S$ and $\Delta Z_S$ are obtained directly from input in Incremental Input Mode (g91) or by subtraction in Absolute Input Mode (g90). $\Delta X_S$ and $\Delta Z_S$ are used to define the orientation of the tangent to the parabola at at $P_S$. $\Delta X_S$ and $\Delta Z_S$ are retained internally by the System 4 software.

$\Delta X_E$, $\Delta Z_E$ — Increments with respect to the X and Z axes from the initial point, $P_S$, to the final point, $P_E$, of the fairing contour. In Incremental Input Mode (g91), $\Delta X_E$ and $\Delta Z_E$ are input in the X and Z fields of the fairing block (g29). In Absolute Input Mode (g90), $\Delta X_E$ and $\Delta Z_E$, are computed internally from the expressions, ($X_E - X_S$) and ($Z_E - Z_S$), respectively.

In a computer-implemented system, the determination of certain logic conditions is easily made by programming. The logic conditions which are examined in the present case are as follows:

Condition 1

$(|\Delta X_E|+|\Delta Z_E|) \neq 0$. The initial and final points, $P_S$ and $P_E$, are not coincident.

If $(|\Delta X_E|+|\Delta Z_E|) = 0$, the fairing block will be ignored. The next control input record will be read.

Condition 2

$(|\Delta X_S|+|\Delta Z_S|) \neq 0$. The slope of the linear segment 14 entering the fairing contour has been defined.

If $(|\Delta X_S|+|\Delta Z_S|) = 0$, the fairing block will be ignored. The distance defined by $\Delta X_E$ and $\Delta Z_E$ will be linearly interpolated.

Condition 3

$(|N_X|+|N_Z|) \neq 0$. The slope of the linear segment 16 exiting the fairing contour has been defined.

If $(|N_X|+|N_Z|) = 0$, the fairing block will be ignored. The distance defined by $N_X$ and $N_Z$ will be linearly interpolated.

Condition 4

The angle, $\theta$, bounded by the tangents entering and exiting segments must be in the range $\epsilon \leq \theta \leq 180 - \epsilon$. ($\epsilon = 5°$).

The expression $$|\tan \theta| = |(\Delta X_S N_Z - \Delta Z_S N_X)/(N_Z \Delta Z_S +_S \Delta X_S N_X)| \geq \tan \epsilon \quad (1)$$

is adequate to verify that $\theta$ is in the allowable range for all values with the exception of $\theta = 90°$. The denominator of expression (1), $$(N_Z \Delta Z_S + \Delta X_S N_X) = \quad (2)$$

for $\theta = 90°$. $\tan 90° = \infty$. Expression (2) must be tested for the 90° case prior to applying the general test (1) for $\theta \neq 90°$. Expression (1) is derived as follows:

$$\tan \theta_E = N_X/N_Z \text{ Slope of exiting tangent} \quad (3)$$

$$\tan \theta_S = \Delta X_S/\Delta Z_S \text{ Slope of entering tangent} \quad (4)$$

$$\tan \theta = \tan(\theta_S - \theta_E) = (\tan \theta_S - \tan \theta_E / 1 + \tan \theta_S \tan \theta_E)$$
Trignometric Identity $\quad (5)$ By substituting (3) and (4) in (5) the following results.

$$\tan(\theta) = (\Delta X_S N_Z - \Delta Z_S N_X/\Delta Z_S N_Z + \Delta X_S N_X) \quad (6)$$

If conditions 1 through 4 of the preceding have been satisfied, the increments, $\Delta X_I$ and $\Delta Z_I$, from the initial point $P_S$ to the point of intersection $P_I$ of the tangent vectors are computed from the following expressions, $$\Delta X_I = (N_Z \Delta X_E - N_X \Delta Z_E)/(N_Z \Delta X_S - N_X \Delta Z_S) \Delta X_S \quad (7)$$

$$\Delta Z_I = (N_Z \Delta X_E - N_X \Delta Z_E)/(N_Z \Delta X_S - N_X \Delta Z_S) \Delta Z_S \quad (8)$$

Equations (7) and (8) result from simultaneous linear solution of the equations, $$X = (\Delta X_S/\Delta Z_S) Z \text{ Entering Tangent} \quad (9)$$

$$X = (N_X/N_Z) Z + (\Delta X_E N_Z - N_X \Delta Z_E) \text{ Exiting Tangent} \quad (10)$$

These equations are defined in a coordinate reference frame with axes parallel and positive in the same sense as the machine reference system and origin at $(X_S, Z_S)$. In this coordinate system the initial point of the exiting segment 16 has the following values, $(\Delta X_E, \Delta Z_E)$. $P_I$ is a valid solution if the following conditions hold:

a. $(\Delta X_I) \Delta X_S \geq 0$ $\quad (11)$ b. $(\Delta Z_I) \Delta Z_S \geq 0$ $\quad (12)$ c. $(\Delta X_E - \Delta X_I) N_X \geq 0$ $\quad (13)$ d. $(\Delta Z_E - \Delta Z_I) N_Z \geq 0$ $\quad (14)$ If any of the preceding quantities are negative the point, $P_I$, is in the entering or exiting linear motion segment. The fairing contour cannot be constructed. The fairing block will be ignored and the distance defined by $\Delta X_E$ and $\Delta Z_E$ will be linearly interpolated. The successive linear increments defining the fairing contour may be computed from the following expressions by varying $i$ over a preselected range of values indicating the number of points to be identified.

$$\Delta X_i = (2(M+1)\Delta X_I - \Delta X_E/M^2) + i(2\Delta X_E - 4\Delta X_I)/M^2 \quad (15)$$

$$\Delta Z_i = 2(M+1)\Delta Z_I - \Delta Z_E/M^2 + i(2\Delta Z_E - 4\Delta Z_I)/M^2 \quad (16)$$

$M$ is the number of linear segments required to approximate the parabola. $\Delta X_I = (X_E - X_I)$ and $\Delta Z_I = (Z_E - Z_I)$, and can be selected to give any desired degree of accuracy, the higher the number for $M$, the higher the accuracy. The expressions (15) and (16) are used to compute the increments of the first M-1 segments. The final segment increments are obtained from, $$\Delta X_M = X_E - X_{M-1} \quad (17)$$

$$\Delta Z_M = Z_E - Z_{M-1} \quad (18)$$

Internally, the software of a computer system can readily compute the coordinates of the end points, $(X_i, Z_i)$, $i = 1, \ldots, M-1$) as part of its normal operations. The number of segments, $M$, required to approximate the parabola is determined using the following relationships, $$M = K/2 \quad (19)$$

where $$K = 2^N \quad (20)$$

$$K^2 = 2^{2N} > \text{maximum of } (K_X^2, K_Z^2) \geq 2^{2(N-1)} \quad (21)$$

$$K_X{}^2 = \left| 2\Delta X_I - \Delta X_E/.707(R) \right| \tag{22}$$

$$K_Z{}^2 = \left| 2\Delta Z_I - \Delta Z_E/.707(R) \right| \tag{23}$$

R is the tolerance value measured normal to the linear segments of the approximated contour. Relationships (19) through (23) ensure that the distances between the theoretical parabola and the linear segments do not exceed R. In a practical system, R may be set to 0.25 inches (6.35 mm for metric applications) or less.

FIG. 5

Figure 5A:
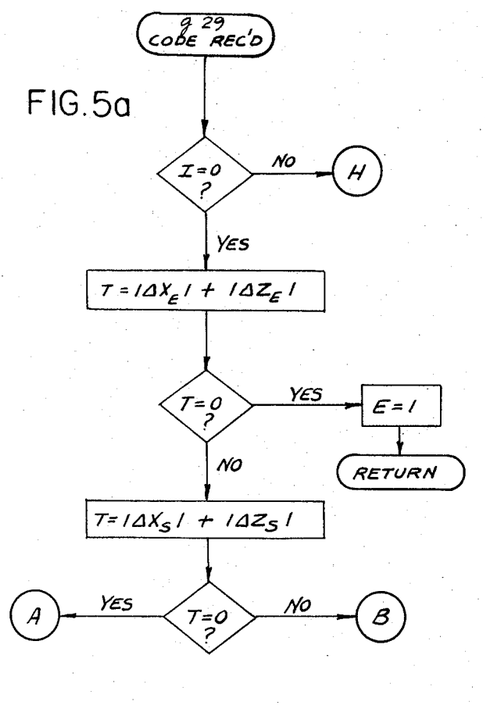
FIG. 5 is a flow chart of the steps to be carried out by a programmable arithmetic unit, such as a digital computer, in the implementation of the present invention; and, FIG. 6 is a block diagram of a portion of an arithmetic unit for carrying out the present invention.
Figure 5B:
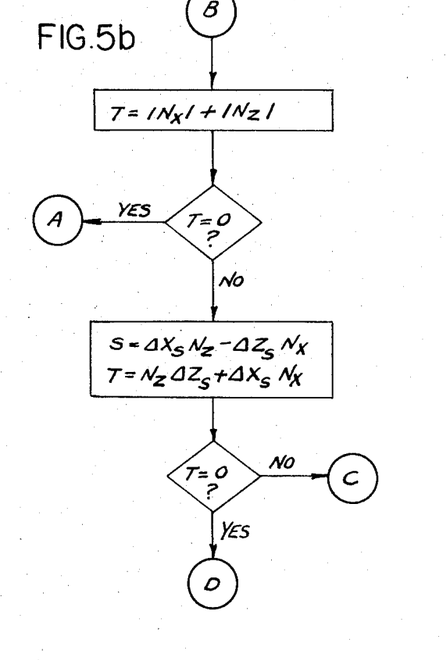
Figure 5C:
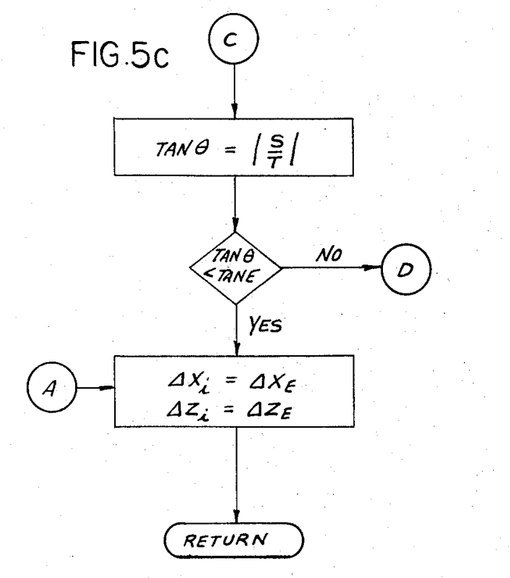
Figure 5D:
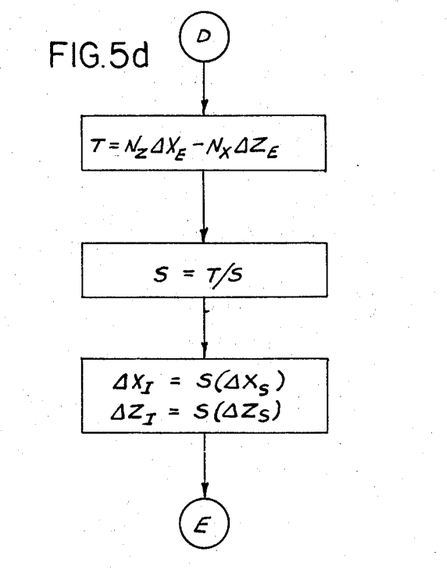
Figure 5E:
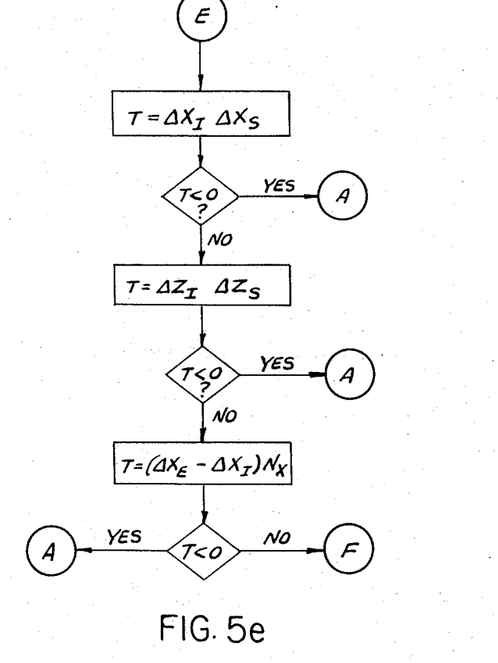
Figure 5F:
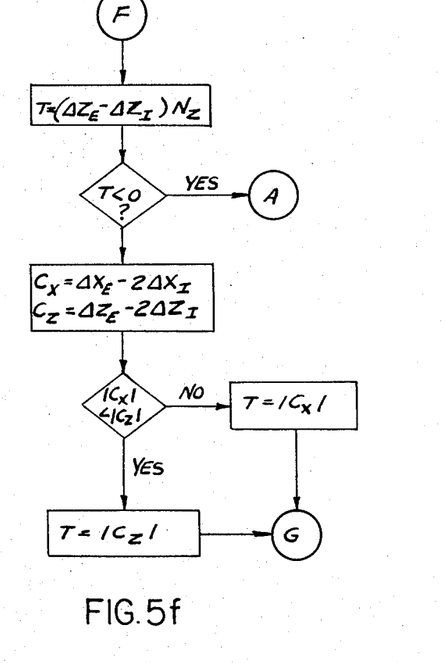
Figure 5G:
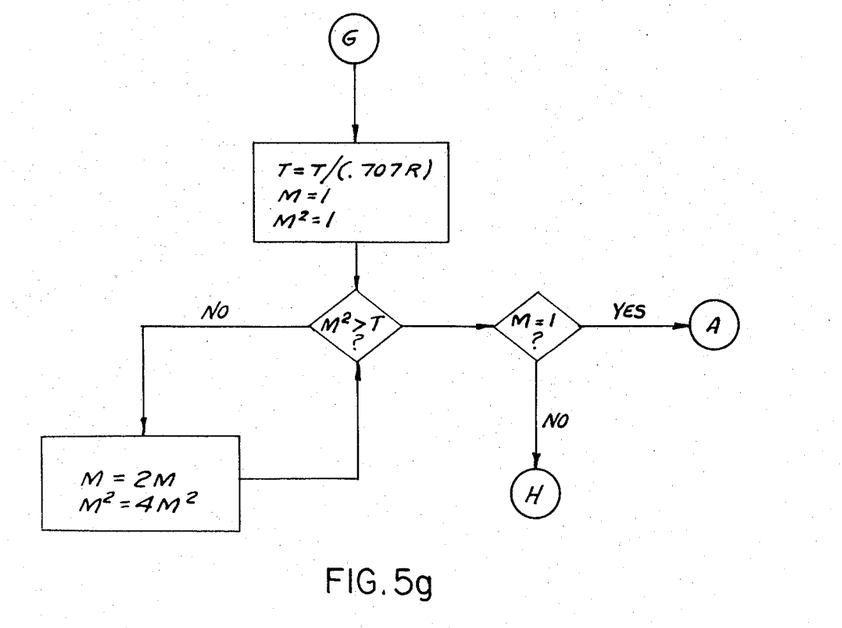
Figure 5H:
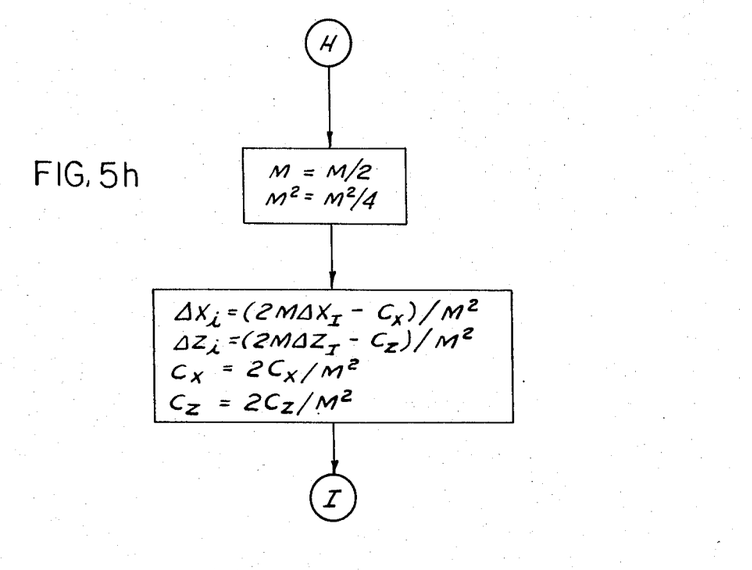
Figure 5I:
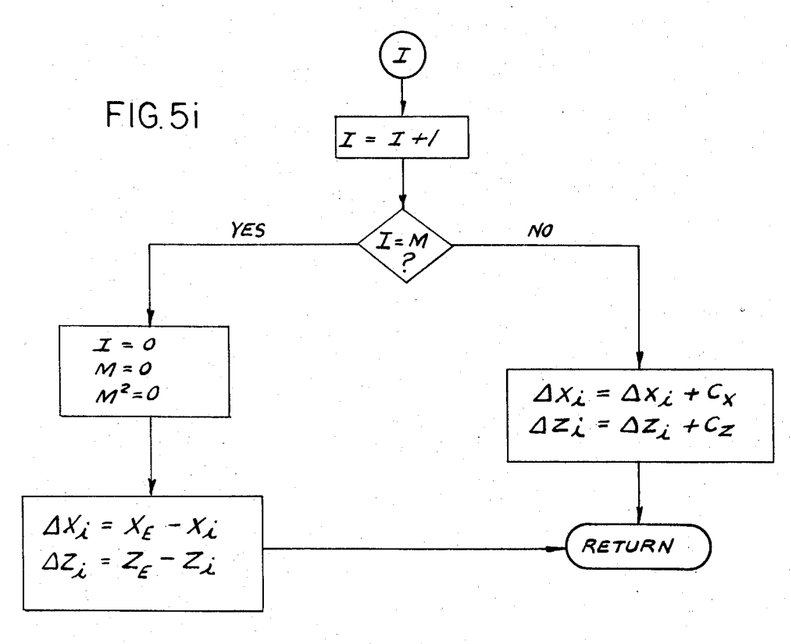

The programming designed to fully implement the arithmetic and logical functions of expressions (1) through (23) above is set forth in the flow charts of FIG. 5. The significance and actual instruction preparation of the flow charts is believed to be apparent from the foregoing description. However, by way of brief additional description:

FIG. 5a shows a routine which ensures that the initial and final fairing points are not coincident and that the first linear segment has been defined;

FIGS. 5b and 5c show a routine which ensures that there is a defined exit segment and that condition number four is satisfied;

FIG. 5d involves the definition of the linear segment between $P_S$ and $P_I$;

FIG. 5e defines the test of expressions (11) through (13) above;

FIG. 5f defines the test of expression (14) above and the computation of constants to be used in computing successive displacements on the fairing contour;

FIG. 5g computes the number of segments needed to satisfy the tolerance requirements for a given fairing;

FIG. 5h defines part of the solution of expressions (15) and (16) above; and,

FIG. 5i defines the remainder of the solution of expressions (15) and (16) above.

FIG. 6

Figure 6:
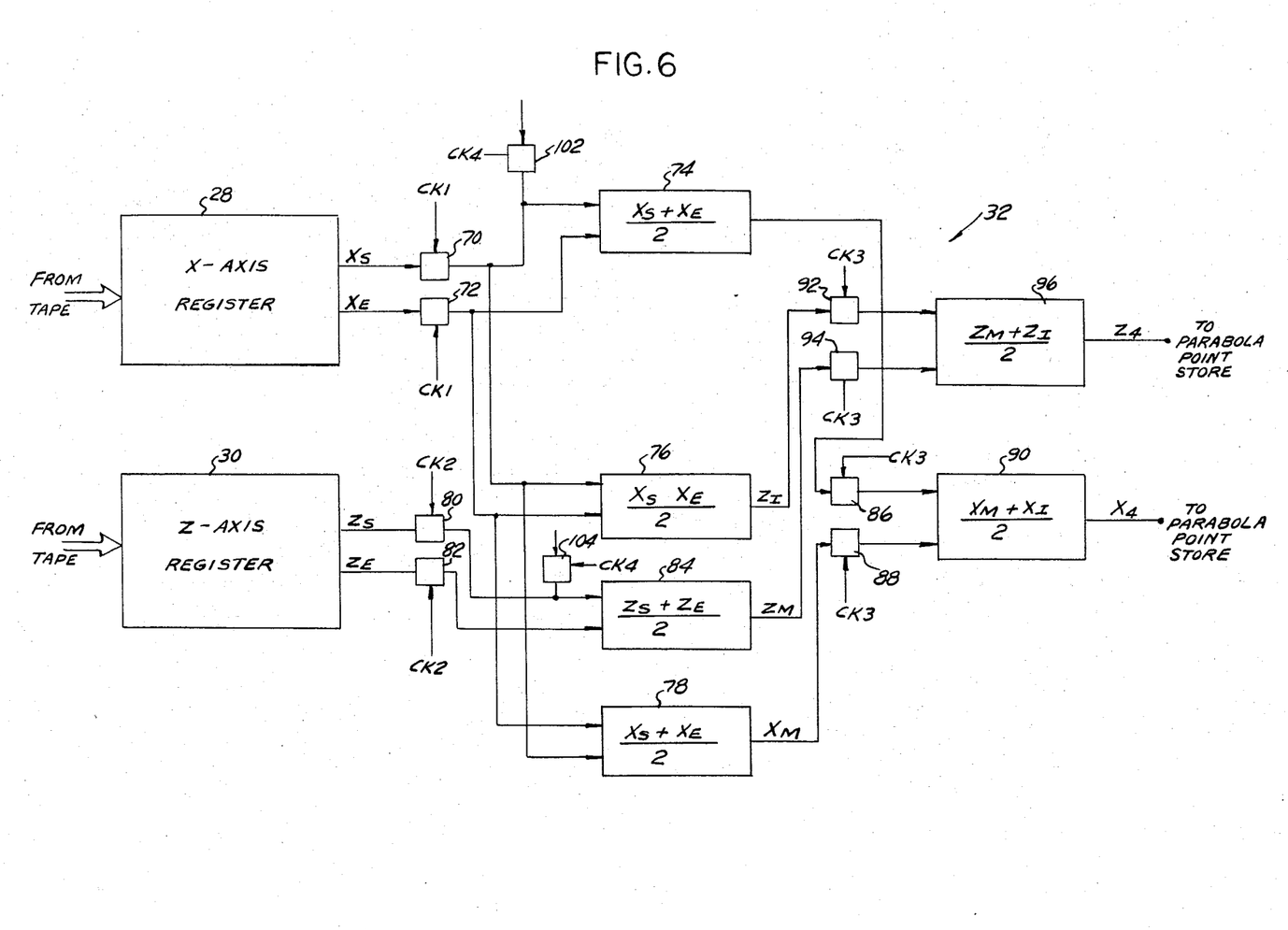

Looking now to FIG. 6, a hardwired arithmetic unit for carrying out the subject process in a simplified alternative fashion is shown. FIG. 6 assumes the axis of the parabola is parallel to the Z-axis.

The X coordinate of the linear segment intersection $P_I$ is determined by gating the $X_S$ and $X_E$ coordinate signals through clocked gates 70 and 72 into calculator 74 which solves the expression shown to produce an output representative of $X_I$. These signals are also clocked into calculators 76 and 78 which solve the expression shown to produce outputs representative of $Z_I$ and $X_M$, the latter being the X-axis coordinate of $P_M$. The $Z_S$ and $Z_E$ data from register 30 is clocked through gates 80 and 82 to calculator 84 which produces an output representating $Z_M$.

The coordinates of the first-determined point $P_4$ on the parabola are determined by gating the outputs of calculators 74 and 78 through gates 86 and 88 into calculator 90. The output of calculator 90 represents the X coordinate of $P_4$ and is placed in the fourth storage position of point store 38 for transfer under clock control to the positioning system. As shown in FIG. 3 by feedback path 100 and in FIG. 6 by gate 102, the $X_4$ coordinate is also fed back to the arithmetic unit 32 to be substituted for the $X_S$ coordinate in the calculation of the next intermediate point on the parabola to be determined.

The output of calculator 96 represents the $Z_4$ coordinate and is derived from the signals gated thereto by gates 92 and 94 during clock time No. 3 as shown. The $Z_4$ coordinate data is fed to the positioning system via point store 38 and also to the arithmetic unit 32 via gate 104.

It will be apparent that the calculators 74, 76, 78, 84, 90, and 96 are such as to be easily implemented in either analog or digital form. Analog apparatus for performing addition, subtraction, multiplication, and division includes resistor ladder networks, variable gain amplifiers, etc. Digital devices include binary counters, flip-flops and logic gates as will be apparent to those skilled in circuit synthesis.

It is to be understood that the invention has been described with reference to illustrative embodiments and that the descriptions of such embodiments are not to be construed in a limiting sense as many modifications and variations to the invention as illustratively set forth are possible. Moreover, it is apparent that the basic process of the invention is applicable not only to the execution of a part program, but also to the preparation of a numerical control record medium, such as punched tape. In such an application, the data defining the linear segments 14 and 16 of FIG. 1 is processed according to the invention to define and store in the tape the intermediate points on the parabola and the execution then proceeds from the tape which is so prepared. In other words, the process of the subject invention may be employed in an "on-line" fashion wherein it directly controls program execution and it may also be employed in an "off-line" fashion wherein data is put into storage complete with the fairing points for later execution.

The embodiments of the invention in which an exclusive property or privilege is claimed are defined as follows:

1. A numerical control apparatus for generating a substantially parabolic fairing contour between first and second successive linear segments of motion of a controlled element comprising: a controlled element, means for controlling the motion of said element along each of at least two independent axes of displacement, a record containing coded representations of the displacements of said element, said record containing coordinates of the loci and slopes of said successive linear segments, said record further containing a representation between said linear segment representations initiating said fairing contour between the end point of said first segment and the initial point of said second segment, means for sequentially reading the coded representations of said record, means for receiving and storing the coordinates of at least said end point of said first linear segment and at least the coordinates of said initial point of said second linear segment, arithmetic means connected to respond to said fairing contour representation to determine the coordinates of at least one intermediate point on a parabolic curve passing through said end point and initial point of said first and second linear segments, respectively, said arithmetic means being connected in output relation to said means for controlling the motion of said element so as to cause said element to move linearly between the coordinates of said intermediate points.

2. Numerical control apparatus as defined in claim 1 including means for determining the number of said intermediate points to be determined.

3. Numerical control apparatus as defined in claim 1 wherein said record includes a punched tape.

4. Numerical control apparatus as defined in claim 1 wherein said arithmetic means includes storage means connected to receive the coordinates of intermediate points.

5. Numerical control apparatus as defined in claim 1 wherein said arithmetic means includes means for determining a series of linear displacement increments in X and Z area passing between intermediate point coordinates according to the expressions:

$$\Delta X_i = [2(M+1)\Delta X_I - \Delta X_E/M^2] + [i(2\Delta X_E - 4\Delta X_I)/M^2]$$

$$\Delta Z_I = [2(M+1)\Delta Z_I - \Delta Z_E/M^2] + [i(2\Delta Z_E - 4\Delta Z_I)/M^2]$$

where
$M$ is the number of such increments,
$i$ represents the increment number,
$X_I$ is the $X$ coordinate of the intersection of the extensions of said first and second linear segments when said first and second segments are respectively extended beyond said end point and said initial point,
$X_E$ is the $X$ coordinate of the initial point on the second linear segment,
$Z_I$ is the Z coordinate of said intersection, and
$Z_E$ is the Z coordinate of said initial point.

6. Numerical control as defined in claim 1 wherein said means for receiving and storing and said arithmetic means comprise a programmable computer having a memory.

7. A method of controlling the displacement of a controlled element within a reference coordinate axis system so as to generate a substantially parabolic fairing contour between the end point of a first linear motion segment and the initial point of a second linear motion segment, said linear motion segments passing through an intersection point when extended past said end point and said initial point comprising the steps of: sequentially reading a displacement record containing the definitions of at least said end point of said first linear segment and said initial point of said second said linear segment; arithmetically determining the loci of a plurality of intermediate linear displacement segments between said end point and said initial point, the points between which said intermediate segments extend lying on a parabolic curve tangent to said first and second linear motion segments at said end point and said initial point; and causing said controlled element to follow said loci at a desired rate.

8. The method defined in claim 7 wherein the step of arithmetically determining is the mathematical equivalent of a construction process involving first the location of the midpoint of the chord between said end and initial points and second the location of the midpoint of a line between said chord midpoint and said intersection point of said linear segments.

9. The method as defined in claim 7 wherein the step of arithmetically determining involves solving the expressions:

$$\Delta X_i = [2(M+1)\Delta X_I - \Delta X_E/M^2] + [i(2\Delta X_E - 4\Delta X_I)/M^2]$$

$$\Delta Z_I = 2(M+1)\Delta Z_I - \Delta Z_E/M^2] + [i(2\Delta Z_E - 4\Delta Z_I)/M^2]$$

10. The method as defined in claim 7 including the further steps of storing data defining said loci, and outputting said data to the controlled element in a controlled sequence.

11. A method of generating a record for controlling the displacement of a controlled element within a reference coordinate axis system so as to generate a substantially parabolic fairing contour between the end point of a first linear motion segment and the initial point of a second linear motion segment, said linear motion segments passing through an intersection point when extended past said end point and said initial point comprising the steps of: sequentially reading a first record containing the definitions of at least said end point of said first linear segment and said initial point of said second linear segment; arithmetically determining the loci of a plurality of intermediate linear displacement segments between said end point and said initial point, the points between which said intermediate segments extend lying on a parabolic curve tangent to said first and second linear motion segments at said end point and said initial point; and placing the data from the first record along with the data defining said loci on a record medium to form a part program.

* * * * *